Oct. 21, 1958  O. S. SWENSON  2,856,913
STONE FINISHING MACHINE
Filed May 6, 1957  2 Sheets—Sheet 1
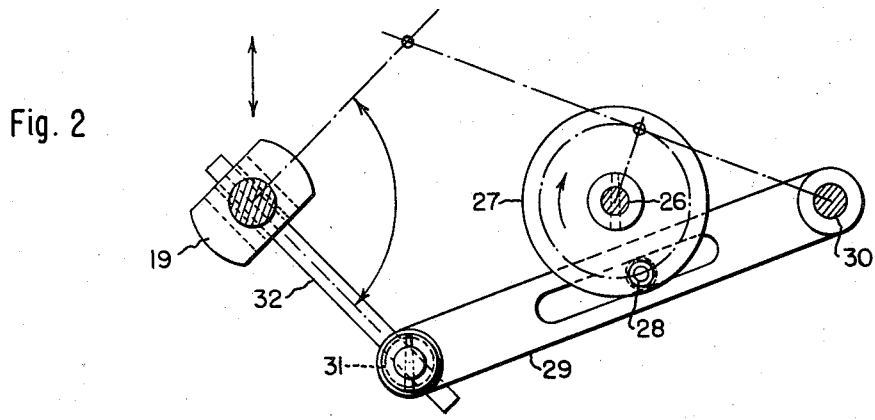
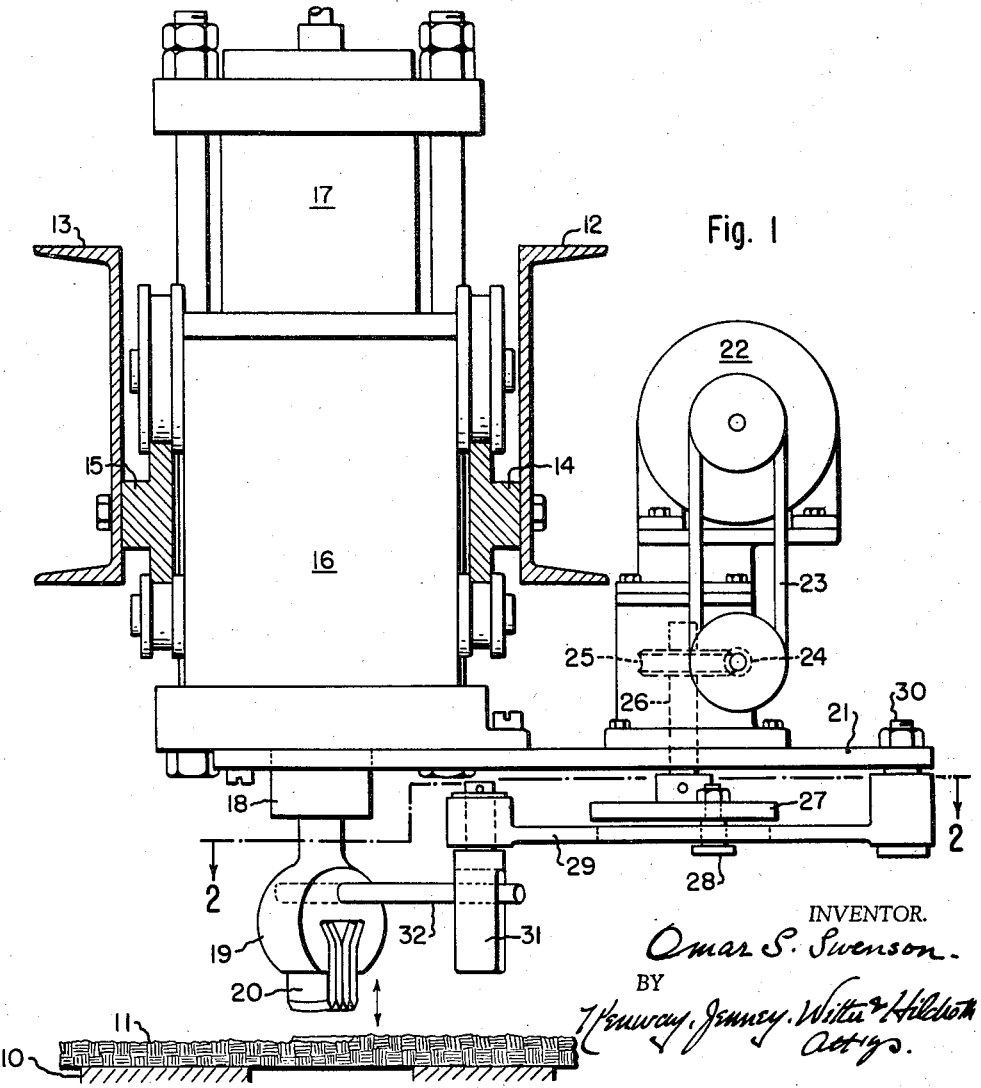
INVENTOR.
Omar S. Swenson United States Patent Office
2,856,913
Patented Oct. 21, 1958

2,856,913

STONE FINISHING MACHINE

Omar S. Swenson, Concord, N. H., assignor to The John Swenson Granite Co., Inc., Concord, N. H., a corporation of New Hampshire Application May 6, 1957, Serial No. 657,333

8 Claims. (Cl. 125—7)

This invention comprises a new and improved machine for finishing the surface of blocks or slabs of granite or other natural or synthetic stone.

I have discovered that new, unexpected and very desirable surface finish may be secured by imparting to an impact tool having a straight edge blade or blades a movement of rotation or oscillation so that the blade meets the work at a constantly varying angular position as it is moved bodily over the surface of the stone.

The invention is herein disclosed as embodied in a machine of the type described in my prior Patent No. 2,724,379, November 22, 1955, although not by any means limited in its application thereto. In that machine an impact tool is arranged to travel along a bridge member across the work and the bridge is indexed transversely with the tool at the end of each traverse. The tool is reciprocated by power while its blade is held in a predetermined angular position. The salient feature of the present invention resides in automatic mechanism for imparting a continuous angular displacement to the blade or blades of the tool during its travel away from the surface of the stone and while power actuated. Another important feature of the invention lies in the novel combination of this mechanism with a movable supporting member such as the bridge of the machine of said patent.

Figure 3:
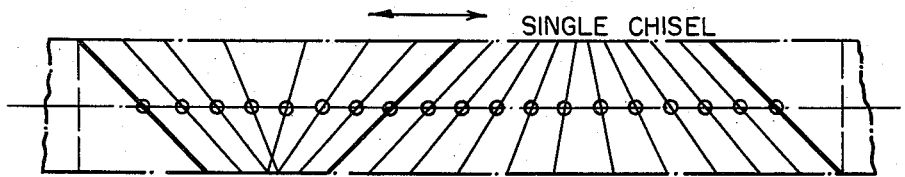
Figure 4:
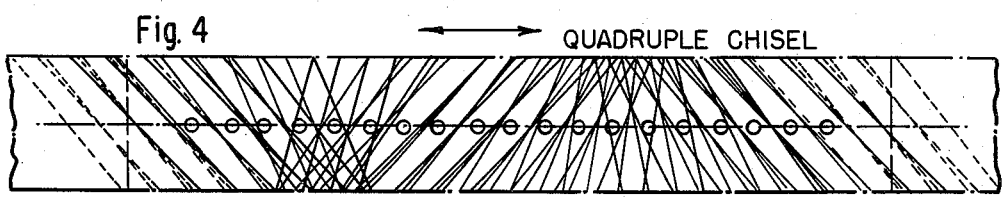
Figure 5:
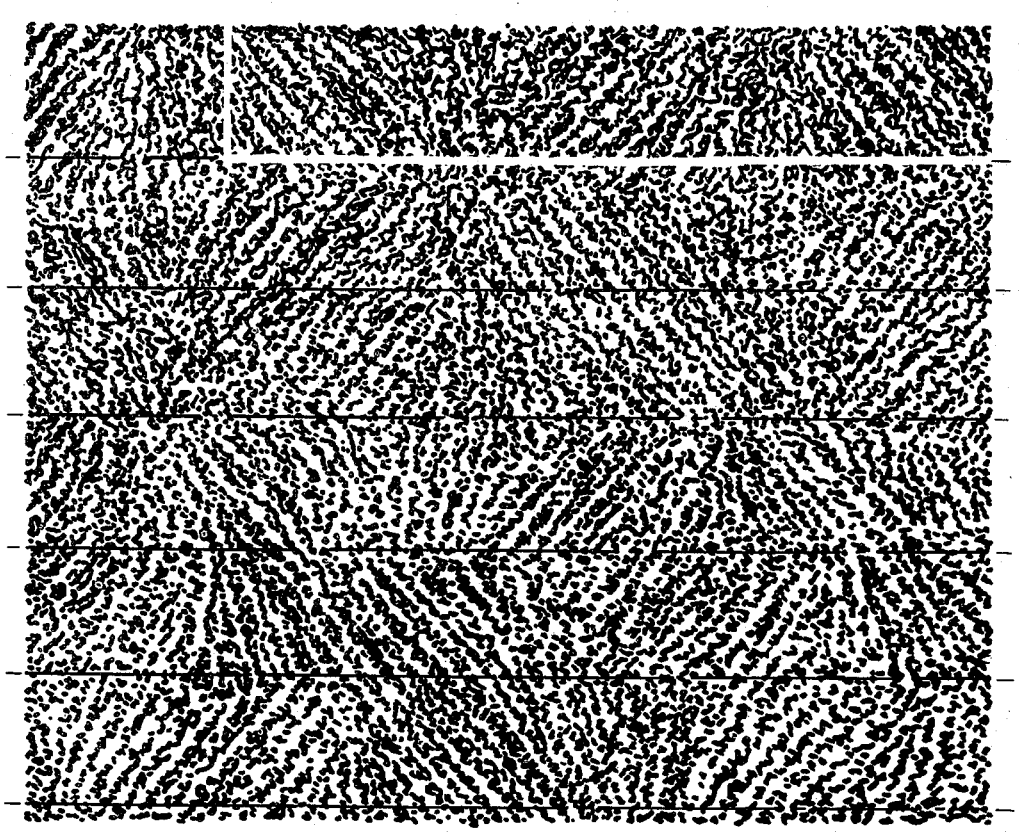

These and other features of the invention will be best understood and appreciated from the following description of a preferred embodiment thereof selected for purposes of illustration and shown in the accompanying drawings in which:

Fig. 1 is a view in elevation of the mechanism for operating the impact tool, the bridge being shown in cross-section, Fig. 2 is a plan view with parts shown in section on the line 2—2 of Fig. 1, Figs. 3 and 4 are diagrammatic views indicating the angular displacement of the blade of the impact tool, and Fig. 5 is a representation of the resulting surface finish produced by the machine.

As suggested in Fig. 1 the machine includes a support 10 for a block of stone 11 and above the support is mounted a bridge formed by a pair of channel irons 12 and 13 to the webs of which are secured rails 14 and 15. A carriage 16 is mounted upon these rails by upper and lower trolley rolls and is guided by the rails for movement longitudinally back and forth above the work. At the end of each traverse the bridge is indexed transversely. Mounted in the carriage is a vertical compressed air cylinder 17 containing a piston to which is secured a chuck 18 for the head 19 of the impact tool which, as herein shown, includes a series of four parallel straight edge blades 20. The mechanism for supporting and indexing the bridge, for moving the carriage on the bridge and actuating the impact tool are not herein shown but may correspond in their construction to the corresponding parts fully described in my said Patent No. 2,724,379 except that the chuck 18 is mounted for free rotation about a vertical axis.

A carrier plate 21 is bolted to the bottom of the carriage. This extends transversely and rearwardly from under the bridge and affords support for a motor 22 connected through a belt 23 to a pulley on one end of a horizontal worm shaft 24 journaled in the motor support. The worm 24 meshes with a worm wheel 25 upon the upper end of a counter shaft 26 journaled also in the motor support and extending downwardly through the plate 21 where it is provided with a crank disk 27 mounted below the level of the beam. The disk 27 carries a crank pin 28 arranged to operate in a longitudinal slot in a lever 29 pivotally mounted at one end by a pivot pin 30 projecting downwardly from the plate 21.

At its free end the lever 29 is provided with a forked head 31 opening downwardly and receiving between its arms a wooden pin 32 fast at its other end in a hole drilled in the head 19 of the impact tool. It has been found desirable to form the connecting pin 32 of wood since thus is imparted to it a resiliency and ability to withstand shock. It will be understood that the impact tool is continuously reciprocated by compressed air at about 800 strokes per minute. The forked head 31 provides a lost motion connection permitting reciprocation of the tool without interruption of the continuous oscillation imparted thereto by the rotation of the crank disk while the chuck 18 and the head 19 of the impact tool carrying the blades 20 are disengaged from contact with the surface of the stone block 11.

It will be apparent that the crank and lever mechanism above described provides a quick return oscillation to the impact tool in that the lever is oscillated at a much higher speed when the crank pin 28 passes between the pivot 30 and the shaft 26 than when it passes to the left of the shaft 26 as shown in Fig. 2. The result of this varying motion is indicated diagrammatically in Fig. 3 where the inclined lines indicate successive angular positions of the blade edge for successive impacts. This figure shows that while the axis of the tool is moved uniformly, the angular displacement of the blade edge is much more rapid in passing its mid position than on either side thereof. The result of the complicated movement thus imparted to the impact tool is to produce a surface finish substantially like that shown in Fig. 5 in which successive traverses of the carriage are indicated as well as the predominant effect of the angular positions of the impact tool.

While the quick-return feature of the mechanism above described results in a characteristic and desirable pattern of finish, my invention is not limited to mechanism operating with that cycle but includes within its scope any mechanism for imparting a continuous or intermittent oscillation or rotation about the axis of a power actuated impact tool while the tool is being moved to or from and without being in contact with the surface of the work.

The impact tool is shown in Fig. 1 as equipped with four blades 20 arranged with parallel substantially straight edges that extend at right angles to the length of the beam when the link 29 occupies its mid position. The number of blades may be varied from 1 to 10 or more in accordance with the nature of the stone being dealt with or the fineness of the texture desired in the finish.

Having thus disclosed my invention and described in detail an illustrative embodiment thereof, I claim as new and desire to secure by Letters Patent:

1. A stone finishing machine comprising a support for a block of stone, a bridge mounted above the support and extending longitudinally over it, a power operated impact tool movable back and forth on the bridge for operation on the block, a motor carried at one side of the bridge, and crank connections between the motor and the tool for oscillating it in all positions of the bridge.

2. A stone finishing machine comprising a support for a block of stone, a bridge extending longitudinally over the support, a power operated impact tool having a straight line blade, means for moving the tool back and forth on the bridge for operation on the block, and automatic mechanism including a separate motor for oscillating the blade of the tool after its impact upon and while free from contact with the surface of the stone about a vertical axis as the tool is moved upon the bridge.

3. A stone finishing machine comprising a support for a stone piece, a horizontal bridge extending above the support and including a pair of spaced channel beams, a carriage movably mounted on said beams and including a compressed air cylinder, an impact tool reciprocated by said cylinder, a separate motor on the carriage, a crank disk rotated by the motor, and a lever having a lost motion connection between the motor and the tool for oscillating the tool while it reciprocates free from contact with the surface of the stone and travels along the bridge.

4. A stone finishing machine as described in claim 3 in which the lost motion connection between the motor and the impact tool includes a wooden pin.

5. A stone finishing machine comprising a horizontal supporting member, a power actuated impact tool having a straight edge blade and being movable along the supporting member while the tool reciprocates vertically at a uniform rate, and automatic mechanism for oscillating the tool including a motor mounted at the rear of the bridge, a crank disk driven by the motor below the level of the bridge, a crank driven lever, a forked head carried by the lever, and a wooden pin projecting from the tool into engagement with said head.

6. A stone finishing machine comprising a horizontal bridge, an impact tool movably mounted on the bridge, compressed air means for reciprocating the tool in a vertical direction, a carrier plate secured to the bridge and projecting rearwardly therefrom, a motor fastened to the plate behind the bridge, and crank connections including a wooden connecting pin for oscillating the blade of the tool as the tool is moved along the bridge.

7. A stone finishing machine comprising a support for a block of stone, a horizontal bridge extending longitudinally over the support, a power operated impact tool mounted on said bridge to reciprocate toward and from the stone and having straight line blades, means for moving the tool back and forth on the bridge, and automatic mechanism for oscillating the blades comprising a crank disk rotatably mounted on the bridge and associated with a lever having a lost motion connection with said impact tool for imparting thereto a quick-return oscillation while the blades are free from contact with the surface of the stone.

8. A stone finishing machine comprising a support for a stone piece, a horizontal bridge extending above the support, a power operated impact tool reciprocably mounted on said bridge, means for moving the tool back and forth on the bridge, a separate motor carried on the bridge and associated with a rotatably mounted crank disk, and a lever associated with said crank and having a lost-motion connection with the impact tool for oscillating said tool while it reciprocates freely before or after its impact upon the surface of the stone.

References Cited in the file of this patent

UNITED STATES PATENTS

| | | |
|---|---|---|
| 702,037 | Stigliz | June 10, 1902 |
| 1,430,692 | Seng | Oct. 3, 1922 |
| 1,639,242 | Versteeg | Aug. 16, 1927 |
| 2,724,379 | Swenson | Nov. 22, 1955 |